US011826732B2

(12) United States Patent
Chan et al.

(10) Patent No.: US 11,826,732 B2
(45) Date of Patent: Nov. 28, 2023

(54) CATALYST FOR MWCNT PRODUCTION

(71) Applicant: NANOCYL SA, Sambreville (BE)

(72) Inventors: Fang-Yue Chan, Achêne (BE); Matthieu Houlle, Wépion (BE); Jean-Philippe Joris, Etterbeek (BE)

(73) Assignee: NANOCYL SA, Sambreville (BE)

( * ) Notice: Subject to any disclaimer, the term of this patent is extended or adjusted under 35 U.S.C. 154(b) by 0 days.

(21) Appl. No.: 18/000,048

(22) PCT Filed: May 27, 2021

(86) PCT No.: PCT/EP2021/064253
§ 371 (c)(1),
(2) Date: Nov. 28, 2022

(87) PCT Pub. No.: WO2021/239903
PCT Pub. Date: Dec. 2, 2021

(65) Prior Publication Data
US 2023/0294080 A1 Sep. 21, 2023

(30) Foreign Application Priority Data

May 29, 2020 (EP) .................................. 20177383

(51) Int. Cl.
B01J 23/847 (2006.01)
B01J 35/00 (2006.01)
B01J 35/10 (2006.01)
B01J 35/02 (2006.01)
B01J 37/04 (2006.01)
B01J 37/02 (2006.01)
B01J 37/08 (2006.01)
B01J 37/00 (2006.01)
C01B 32/162 (2017.01)
H01M 4/587 (2010.01)
B01J 21/04 (2006.01)

(52) U.S. Cl.
CPC .......... B01J 23/8472 (2013.01); B01J 21/04 (2013.01); B01J 35/0066 (2013.01); B01J 35/023 (2013.01); B01J 35/026 (2013.01); B01J 35/1009 (2013.01); B01J 35/1014 (2013.01); B01J 37/0036 (2013.01); B01J 37/0219 (2013.01); B01J 37/0236 (2013.01); B01J 37/04 (2013.01); B01J 37/088 (2013.01); C01B 32/162 (2017.08); H01M 4/587 (2013.01); C01B 2202/06 (2013.01); C01B 2202/22 (2013.01)

(58) Field of Classification Search
CPC .... B01J 23/8472; B01J 21/04; B01J 35/0066; B01J 35/023; B01J 35/026; B01J 35/1009; B01J 35/1014; B01J 37/0036; B01J 37/0219; B01J 37/0236; B01J 37/04; B01J 37/088; C01B 32/162; C01B 2202/06; C01B 2202/22; H01M 4/587
See application file for complete search history.

(56) References Cited

U.S. PATENT DOCUMENTS

| 9,956,546 | B2 | 5/2018 | Kim et al. | |
| 2008/0213160 | A1 | 9/2008 | Silvy et al. | |
| 2015/0273441 | A1* | 10/2015 | Kim | B01J 23/881 502/332 |
| 2021/0139331 | A1* | 5/2021 | Kang | C01B 32/162 |

FOREIGN PATENT DOCUMENTS

| EP | 2883609 A1 | 6/2015 |
| EP | 3053877 A1 | 8/2016 |
| EP | 3053880 A1 | 8/2016 |
| EP | 3156125 A1 | 4/2017 |
| KR | 101781252 B1 | 9/2017 |
| WO | 03004410 A1 | 1/2003 |
| WO | 2020022822 A1 | 1/2020 |

OTHER PUBLICATIONS

International Search Report and Written Opinion of the International Searching Authority from the European Patent Office, in PCT/EP2021/064253 dated Aug. 30, 2021, which is an international application corresponding to this U.S. application.
Black, David R., et al.; "Certification of Standard Reference Material 1976B," National Institute of Standards and Technology, Nov. 4, 2015.
Cruz, Aloisio Magela de Aguilar, et al.; "Boehmite-supported vanadium oxide catalysts," Applied Catalysis A: General 167, 1998, pp. 203-213.
Malvern Panalytical; "Smarter particle sizing," Mastersizer 3000 brochure, 2021.
Soares, Guilherme Augusto Batista, et al.; "Mineralogical quantification of boehmitic bauxite by X-ray diffraction," School of Mines Magazine, vol. 67, No. 1, 2014, pp. 41-46.
Steinfeldt, N., et al.; "Comparative Studies of the Oxidative Dehydrogenation of Propane in Micro-Channels Reactor Module and Fixed-Bed Reactor," Studies in Surface Science and Catalysis, Institute for Applied Chemistry Berlin-Adlershof, 2001, pp. 185-190.

* cited by examiner

Primary Examiner — Andrew J. Oyer
(74) Attorney, Agent, or Firm — Kolitch Romano Dascenzo Gates LLC

(57) ABSTRACT

An iron-free supported catalyst for the selective conversion of hydrocarbons to carbon nanotubes may include cobalt and vanadium as active catalytic metals in any oxidation state on a catalyst support comprising aluminum oxide hydroxide. The mass ratio of cobalt to vanadium is between 2 and 15; the mass ratio of cobalt to aluminum is between $5.8 \cdot 10^{-2}$ and $5.8 \cdot 10^{-1}$; and the mass ratio vanadium to aluminum is between $5.8 \cdot 10^{-3}$ and $8.7 \cdot 10^{-2}$. The present disclosure is further related to a method for the production of this iron-free supported catalyst and to a method for the production of carbon nanotubes using the iron-free supported catalyst.

23 Claims, No Drawings

CATALYST FOR MWCNT PRODUCTION

FIELD

The present disclosure relates to a supported catalyst system, for the conversion of hydrocarbons into carbon nanotubes and in particular to an iron-free supported catalyst system for a multi-walled carbon nanotube production process with improved selectivity and yield.

INTRODUCTION

Carbon nanostructures (CNSs) refer collectively to nano-sized carbon structures having various shapes, such as nanotubes, nanohairs, fullerenes, nanocones, nanohorns, and nanorods. Carbon nanostructures can be widely utilized in a variety of technological applications because they possess excellent characteristics.

Carbon nanotubes (CNTs) are tubular materials consisting of carbon atoms arranged in a hexagonal pattern and have a diameter of approximately 1 to 100 nm. Carbon nanotubes exhibit insulating, conducting or semi-conducting properties depending on their inherent chirality. Carbon nanotubes have a structure in which carbon atoms are strongly covalently bonded to each other. Due to this structure, carbon nanotubes have a tensile strength approximately 100 times greater than that of steel, they are highly flexible and elastic, and are chemically stable Carbon nanotubes are divided into three types: single-walled carbon nanotubes (SWCNTs) consisting of a single sheet and having a diameter of about 1 nm; double-walled carbon nanotubes (DWCNTs) consisting of two sheets and having a diameter of about 1.4 to about 3 nm; and multi-walled carbon nanotubes (MWCNTs) consisting of three or more sheets and having a diameter of about 5 to about 100 nm.

Carbon nanotubes are being investigated for their commercialization and application in various industrial fields, for example, aerospace, fuel cell, composite material, biotechnology, pharmaceutical, electrical/electronic, and semiconductor industries, due to their high chemical stability, flexibility and elasticity.

Carbon nanotubes are generally produced by various techniques, such as arc discharge, laser ablation, and chemical vapor deposition. However, arc discharge and laser ablation are not appropriate for mass production of carbon nanotubes and require high arc production costs or expensive laser equipment. Catalytic Chemical Vapor Deposition (CCVD) of hydrocarbons over metallic catalysts provides, with respect to other methods, higher yields and quality and simplifies the manufacturing process on an industrial scale.

Most researches carried out in the CCVD technology are presently focused on developing new catalysts and reaction conditions for controlling the type (single, double or multi-walled), diameter, length and purity of carbon nanotubes. The structural, physical and chemical properties of carbon nanotubes have been related to their electrical conducting capacity, mechanical strength and thermal, optical and magnetic properties.

WO 03/004410 A1 discloses a large variety of metal oxide systems (such as Co, Fe, Ni, V, Mo and Cu) and catalyst supports (such as $Al(OH)_3$, $Ca(OH)_2$, $Mg(OH)_2$, $Ti(OH)_4$, $Ce(OH)_4$ and $La(OH)_3$), for the single-walled and multi-walled carbon nanotube production. The various metals and mixtures of metals in this document were tested for their selectivity properties, i.e. the ability of the catalyst to selectively produce single, double or multi-walled nanotubes with respect to a certain proportion of amorphous carbon or fibers formed simultaneously during the reaction.

EP 2 883 609 A1 discloses an impregnated supported catalyst and a carbon nanotube aggregate comprising the impregnated supported catalyst, said impregnated supported catalyst being prepared by sequentially adding a multicarboxylic acid and precursors of first (Co) and second (Fe, Ni) catalytic components to precursors of first (Mo) and second (V) active components to obtain a transparent aqueous metal solution, impregnating an aluminum-based granular support with the transparent aqueous metal solution, followed by drying and calcination, wherein the supported catalyst has a bulk density of 0.8 to 1.5 $g/cm^3$.

U.S. Pat. No. 9,956,546 A1 discloses a catalyst for producing carbon nanotubes, comprising a support and a graphitization metal catalyst supported on the support wherein the graphitization metal catalyst is a multi-component metal catalyst comprising a main catalyst and an auxiliary catalyst, wherein the main catalyst is selected from Co, Fe, and mixtures thereof and the auxiliary catalyst is V, and wherein the catalyst is a supported catalyst obtained by calcining aluminum hydroxide at a primary calcination temperature of 250° C. to 500° C. to form the support, supporting a catalytic metal precursor on the support, and calcining the catalytic metal precursor supported on the support at a secondary calcination temperature of 450° C. to 800° C.

EP 3 053 877 A1 discloses a method for producing carbon nanotubes, comprising primarily calcining support precursor having a BET specific surface area of 1 $m^2/g$ or less at a temperature of 100 to 450° C. to form a support, supporting a graphitization metal catalyst on the support, secondarily calcining the catalyst supported on the support at a temperature of 100 to 500° C. to prepare the supported catalyst, and bringing the supported catalyst into contact with a carbon source in the gas phase to form carbon nanotubes, wherein the support precursor is aluminum trihydroxide and wherein the graphitization metal catalyst is a binary metal catalyst selected from Co/Mo, Co/V, Fe/Mo and Fe/V.

US 2008 213160 A1 discloses a method for synthesizing a supported catalyst with a view to the production of multi-walled carbon nanotubes comprising the following steps: mixing an $Al(OH)_3$ powder having a particle size lower than about 80 μm with an aqueous solution of an iron and cobalt salt, the whole forming a paste; drying said paste until a powder with a moisture level lower than about 5% by weight is obtained; selecting the particle-size fraction of said supported catalyst that is lower than about 63 μm; and producing nanotubes using the supported catalyst having a particle size lower than about 63 μm.

KR 101781252 discloses a method for producing carbon nanotube aggregates comprising heat treating a carrier precursor comprising a layered metal hydroxide and a non-layered metal hydroxide to form a porous carrier; supporting a catalyst metal or a catalyst metal precursor on the carrier to form a supported catalyst; and forming a carbon nanotube aggregate in which the supported catalyst and the carbon-containing compound are brought into contact with each other under a heating region to form a bundle and an entangled carbon nanotube aggregate. The catalyst metal combines an element selected from iron, cobalt, and nickel, an element selected from titanium, vanadium, and chromium, and an element selected from molybdenum (Mo) and tungsten (W).

EP 3 156 125 A1 discloses a method for producing a carbon nanotube aggregate, comprising:
mixing a support with an aqueous solution of a graphitization metal catalyst precursor to form a paste;
drying the paste to remove water, followed by calcination to obtain a supported catalyst; and
bringing the supported catalyst into contact with a carbon-containing compound under heating to react with each other,
wherein the water removal rate from the paste is adjusted to 5 to 30% by weight to control the bulk density of the carbon nanotubes.
The graphitization catalyst is a catalyst containing only iron (Fe) or a binary or multi-component catalyst comprising one or more metals selected from cobalt (Co), molybdenum (Mo), and vanadium (V).

EP 3 053 880 A1 discloses a method for producing a carbon nanotube aggregate, comprising calcining aluminum hydroxide at a primary calcination temperature of 100° C. to 500° C. to form a support; supporting a catalytic metal precursor on the support; calcining the catalyst-containing support at a secondary calcination temperature of 100° C. to 800° C. to obtain a supported catalyst; and bringing the supported catalyst into contact with a carbon-containing compound under heating to react with each other, wherein the primary calcination temperature, the secondary calcination temperature, the amount of the catalyst supported or the reaction time is controlled such that the carbon nanotube aggregate has a bulk density of 10 kg/m$^3$ or more. The catalytic metal comprises Fe, Co, Mo, V or a combination of two or more thereof. The graphitization metal catalyst may be a composite catalyst consisting of a main catalyst and an auxiliary catalyst. In this case, the main catalyst may include iron (Fe) or cobalt (Co) and the auxiliary catalyst may be molybdenum (Mo), vanadium (V) or a combination thereof. An organic acid is added in a molar ratio of 5:1 to 30:1 relative to the catalytic metal for the preparation of the supported catalyst.

Carbon nanotubes have attracted attention as potential electrode materials in lithium batteries.

Typical lithium-ion batteries utilize carbon anodes (negative electrode) and lithiated transition metal oxide cathodes (positive electrode) situated on opposite sides of a microporous polymer separator.

A lithium-ion cell begins life with all of the lithium in the cathode and upon charging, a percentage of this lithium is moved over to the anode and intercalated within the carbon anode.

A failure in lithium-ion batteries is the result of a formation of dendrites within the battery. Dendrites are microscopic metal deposits that can form within the cell. Dendrite formation generally begins in the anode and creates an internal shortcut when it extends through the separator to the cathode.

When iron impurities from any electrode dissolve in the electrolyte, there is a significant risk that these impurities migrate on the anode side and initiate dendrite growth by deposition. Because of this, iron-free materials are required as electrode material.

When using MWCNT's as electrode material, the risk of battery failure caused by those dendrites arises.

Consequently, MWCNT's comprising interstitial iron-components obtained by a process using a catalytic system comprising an iron-based graphitization catalyst should be avoided.

Therefore, a need exists for MWCNT, produced by a CCVD-process of hydrocarbons over iron-free metallic catalysts with improved selectivity and productivity.

SUMMARY

The aim of the present disclosure is to disclose an iron-free catalyst for the preparation of MWCNT and a method for its preparation, as well as the use of those carbon nanotubes in batteries.

The present disclosure describes an iron-free supported catalyst for the selective conversion of hydrocarbons to carbon nanotubes, said catalyst comprising cobalt and vanadium as active catalytic metals in any oxidation state on a catalyst support comprising aluminum oxide hydroxide wherein:
the mass ratio of cobalt to vanadium is between 2 and 15;
the mass ratio of cobalt to aluminum is between $5.8 \cdot 10^{-2}$ and $5.8 \cdot 10^{-1}$; and
the mass ratio of vanadium to aluminum is between $5.8 \cdot 10^{-3}$ and $8.7 \cdot 10^{-2}$.

Preferred embodiments disclose one or more of the following features:
the mass ratio of cobalt to vanadium is between 3.0 and 11;
the mass ratio of cobalt to aluminum is between $1.2 \cdot 10^{-1}$ and $4.3 \cdot 10^{-1}$; and
the mass ratio of vanadium to aluminum is between $1.2 \cdot 10^{-2}$ and $5.8 \cdot 10^{-2}$;
the iron-free catalyst of the present disclosure additionally comprises molybdenum as active catalyst, wherein:
the mass ratio of molybdenum to aluminum is between $1.2 \cdot 10^{-3}$ and $2.3 \cdot 10^{-2}$; and
the mass ratio of cobalt to the combined mass of vanadium and molybdenum is between 2 and 15;
the iron-free molybdenum comprising the catalyst of the present disclosure wherein:
the mass ratio of molybdenum to aluminum is between $1.7 \cdot 10^{-3}$ and $1.7 \cdot 10^{-2}$; and
the mass ratio of cobalt to the combined mass of vanadium and molybdenum is between 3 and 11;
the catalyst support of the present disclosure comprises at least 30% by weight of aluminum oxide hydroxide, based on the total of aluminum hydroxides and/or aluminum oxides and aluminum oxide hydroxide;
the iron-free catalyst has a maximum diffraction peak at a 2θ angle of 35° to 38° in the XRD pattern recorded in the 2θ range of 10° to 80°, wherein
when the intensity of the maximum diffraction peak and the intensity of a diffraction peak at a 2θ angle of 17° to 22° are defined as "a" and "b", respectively, the ratio b/a is in the range of 0.10 to 0.7, and
when the intensity of a diffraction peak at a 2θ angle of 63° to 67° is defined as "c", the ratio c/a is in a range of 0.51 to 0.7

The present disclosure further discloses a method for the production of the iron-free supported catalyst comprising the steps of:
contacting an aqueous solution, comprising one or more polycarboxylic acid(s) and/or the salt(s) of polycarboxylic acids, with one or more vanadium-based precursor(s) and optionally one or more molybdenum-based precursor(s);
contacting the one or more cobalt-based precursor(s) with the aqueous solution comprising the vanadium-based precursor(s) and the optional additional molybdenum-based precursor(s) to form a water-based mixture of catalytic precursors;

contacting aluminum hydroxide, having a BET comprised between 3 and 18 m$^2$/g, with the water-based mixture comprising the catalytic precursors to form a water-based mixture of aluminum hydroxide and the catalytic precursors;

drying the water-based mixture of aluminum hydroxide and the catalytic precursors to form a dried mixture;

calcinating the dried mixture at a temperature of at least 200° C., to form a calcinated product;

grinding the calcinated product to a powder.

Preferred embodiments of the method for the production of iron-free supported catalyst disclose one or more of the following features:

the water-based mixture of aluminum hydroxide and the catalytic precursors is dried at a predetermined temperature of at least 100° C. for at least 1 hour with an air flow of at least 0.1 m$^3$/h;

the water-based mixture of aluminum hydroxide and the catalytic precursors is dried at a predetermined temperature comprised between 100 and 150° C. for a period comprised between 1 hour and 10 hours with an air flow comprised between 0.1 m$^3$/h and 1 m$^3$/h.

the water-based mixture of aluminum hydroxide and the catalytic precursors is dried by spray drying;

the dried mixture is calcinated at a temperature comprised between 200 and 600° C. for a period comprised between 1 and 24 hours with an air flow comprised between 0.1 m$^3$/h and 1 m$^3$/h;

the calcinated product is ground to a powder with a volume median particle diameter ($D_{50}$) of less than 450 µm;

the aluminum hydroxide is characterized by a specific surface area (BET) comprised between 5 and 16 m$^2$/g;

the aluminum hydroxide is selected from gibbsite or bayerite;

the cobalt-based precursor(s), the vanadium-based precursor(s), the molybdenum-based precursor(s) and the support precursor have a purity of at least 95%;

the cobalt-based precursor is cobalt(II) acetate tetrahydrate and/or cobalt(II) nitrate tetrahydrate, the vanadium-based precursor is ammonium metavanadate and the molybdenum-based precursor is ammonium heptamolybdate tetrahydrate;

the polycarboxylic acid is a blend of citric acid and malic acid wherein the mole ratio malic acid/citric acid is between 0.5 and 5.

The present disclosure further discloses a method for producing multi-walled carbon nanotubes from the iron-free supported catalyst, comprising the steps of:

charging the catalyst into a reactor;

heating the catalyst to a temperature comprised between 500° C. and 900° C.;

supplying a carbon source to the reactor while maintaining the temperature comprised between 500° C. and 900° C.;

contacting the catalyst with the carbon source for a time period of at least 1 minute.

Preferred embodiments of the method for the production of multi-walled carbon nanotubes disclose one or more of the following features:

the space time between catalyst and carbon source is between 0.1 and 0.8 g·h/mole;

the carbon source is selected from the group consisting of methane, ethylene, acetylene, methanol, ethanol and mixtures thereof.

The present disclosure further discloses multi-walled carbon nanotubes obtained by the method for the production of multi-walled carbon nanotubes of the present disclosure, comprising between 0.1 and 13% by weight, preferably 1 and 10% by weight of the iron-free supported catalyst, said iron-free supported catalyst being obtained by the method for the preparation of iron-free supported catalyst of the present disclosure.

The present disclosure further discloses a polymer matrix comprising said multi-walled carbon nanotubes, obtained by the method of the present disclosure.

The present disclosure further discloses the use of said multi-walled carbon nanotubes, obtained by the method of the present disclosure, in batteries.

DETAILED DESCRIPTION

The present disclosure discloses a supported iron-free catalyst giving rise to increased selectivity in multi-walled nanotube production with specific characteristics, said improved multi-walled selectivity being obtained at a high yield while catalyst consumption is reduced. The present disclosure also discloses an economically attractive process for obtaining said supported catalyst.

By iron-free catalyst, the present disclosure means that the iron content is reduced as much as possible, with the exception of unavoidable traces. Nevertheless the iron content within the overall transition metal content is less than 1000 ppm, preferably less than 500 ppm, more preferably less than 200 ppm, most preferably less than 100 ppm.

In a first embodiment of the present disclosure, the supported catalyst is an iron-free two-component catalyst comprising a first cobalt-based catalytic component and a second vanadium-based catalytic component, both preferably in the form of oxide, and supported on a support comprising aluminum oxide ($Al_2O_3$) and/or aluminum hydroxide ($Al(OH)_3$) and aluminum oxide hydroxide (AlO(OH)) (further called the "support element")

In a second embodiment of the present disclosure, the supported catalyst is an iron-free three-component graphitization catalyst comprising a first cobalt-based catalytic component, a second vanadium-based catalytic component and a molybdenum-based catalytic component, all preferably in the form of oxide, and supported on a support comprising aluminum oxide and/or aluminum hydroxide and aluminum oxide hydroxide (further called the "support element").

Preferably, the support precursor is aluminum hydroxide, more preferably gibbsite or bayerite.

Preferably, the support precursor is characterized by a volume median particle diameter ($D_{50}$) of less than 70 µm and a specific surface area of less than 20 m$^2$/g.

Preferably, the support precursor is gibbsite, characterized by a specific surface area between 3 and 18 m$^2$/g, preferably between 5 and 16 m$^2$/g.

Preferably, the cobalt-based catalytic precursor of the graphitization catalyst is obtained from a cobalt-based precursor, said precursor being a cobalt salt, a cobalt oxide or a cobalt compound such as $Co(NO_3)_2 \cdot 6H_2O$; $Co_2(CO)_8$ and $Co(OAc)_2 \cdot 4H_2O$.

Preferably, the vanadium-based catalytic precursor of the graphitization catalyst is obtained from a vanadium-based precursor, said precursor being a vanadium salt, a vanadium oxide or a vanadium compound such as $NH_4VO_3$.

Preferably, the molybdenum-based catalytic precursor of the graphitization catalyst is obtained from a molybdenum-based precursor, said precursor being a molybdenum salt, a molybdenum oxide or a molybdenum compound such as $(NH_4)_6Mo_7O_{24}\cdot 4H_2O$; $Mo(CO)_6$ or $(NH_4)_2MoS_4$.

The present disclosure also discloses a method for the production of said supported catalyst comprising the steps of:
adding:
in the method of the first embodiment, a specific amount of water comprising a specific amount of one or more polycarboxylic acid(s) and/or the salts thereof to a specific amount of one or more vanadium-based precursor(s) and mixing until a transparent solution is obtained;
in the method of the second embodiment, a specific amount of water comprising a specific amount of one or more polycarboxylic acid(s) and/or the salts thereof to a specific amount of one or more vanadium-based precursor(s) and a specific amount of one or more molybdenum-based precursor(s), and mixing until a transparent solution is obtained;
contacting the one or more cobalt-based precursor(s) with the aqueous solution comprising the vanadium-based precursor(s) and the optional molybdenum-based precursor(s), wherein said one or more cobalt-based precursors are added in the form of a powder or a wetted powder or an aqueous solution or any form having a water content comprised between powder and aqueous solution;
adding the support precursor and mixing during at least 1 minute;
drying the mixture by appropriated means, preferably at a fixed predetermined temperature of at least 100° C. for at least 1 hours with an air flow of at least 0.1 m$^3$/h;
calcinating the mixture by appropriated means, preferably at a fixed predetermined temperature of at least 200° C. for at least 1 hour with an air flow of at least 0.1 m$^3$/h;
grinding the calcinated product to a volume median particle diameter ($D_{50}$) of less than 450 μm.

The polycarboxylic acids used in the method of the present disclosure are preferably selected from the group consisting of dicarboxylic acids, tricarboxylic acids, tetracarboxylic acids and mixtures thereof. Examples of such multicarboxylic acids include oxalic acid, succinic acid, tartaric acid, malic acid, fumaric acid, malic acid, itaconic acid, citraconic acid, mesaconic acid, citric acid, 2-butene-1,2,3-tricarboxylic acid and 1,2,3,4-butanetetracarboxylic acid.

By salts of polycarboxylic acid, the present disclosure means the polycarboxylic acid wherein at least one carboxylic acid group is converted into an ammonium or alkali metal salt.

Preferably, the polycarboxylic acid is citric acid or malic acid; preferably the polycarboxylic acid salt is the ammonium salt.

Preferably, one or more polycarboxylic acid(s) and/or salt(s) thereof are added in such an amount that the resulting aqueous solution comprises between 0.5 and 25%, more preferably between 4 and 15% of polycarboxylic acid(s) and/or salt(s).

Preferably, the polycarboxylic acid used in the method of the present disclosure is a blend of citric acid and malic acid wherein the mole ratio malic acid/citric acid is between 0.5 and 5, preferably between 1.5 and 2.5.

In the method of the first embodiment, 1000 g of support precursor is added to an aqueous mixture obtained from mixing an aqueous solution comprising 5 to 70 g of vanadium-based precursor in between 300 to 3000 g of water and between 80 and 850 g of cobalt-based precursor as a powder or as an aqueous mixture comprising up to 3000 g of water.

In the method of the second embodiment, 1000 g of support precursor is added to an aqueous mixture obtained from mixing an aqueous solution comprising 5 to 70 g of vanadium-based precursor and 1 to 15 g molybdenum precursor in between 300 to 3000 g of water and between 80 and 850 g of cobalt-based precursor as a powder or as an aqueous mixture comprising up to 3000 g of water.

In the method according to the present disclosure:
water, at a temperature comprised between 20 and 90° C., preferably between 50 and 70° C., comprising one or more polycarboxylic acid(s) and/or salt(s) of polycarboxylic acid(s), is added to the vanadium-based precursor and the optional molybdenum-based precursor and mixed, for example by means of a paddle mixer, for a period comprised between 5 and 60 minutes, preferably between 10 and 20 minutes;
the cobalt-based precursor, either as a powder, a wetted precursor or as an aqueous solution, is added to the aqueous solution comprising the vanadium-based precursor and the optional molybdenum precursor; when added as a wetted precursor or as an aqueous solution, water, at a temperature comprised between 20 and 90° C., preferably between 50 and 70° C., is added to the cobalt-based precursor and mixed for a period comprised between 5 and 60 minutes, preferably between 10 and 20 minutes;
the support precursor is added and mixed (to avoid clumping) to the aqueous solution comprising cobalt-based precursor, vanadium-based precursor and the optional molybdenum precursor;
after completing of the support precursor addition, the resulting paste is further mixed for a period comprised between 5 and 60 minutes, preferably for a period comprised between 10 and 20 minutes;
the paste is transferred to ceramic crucibles with a large opening and heated:
as a first step to a temperature comprised between 100 and 150° C., preferably between 110 and 130° C. for a period comprised between 60 and 600 minutes, preferably between 150 and 330 minutes, said temperature being obtained using a heating gradient comprised between 1.0 and 5.0° C./min.; and an air flow between 0.1 and 1.0 m$^3$/h, preferably between 0.4 and 0.6 m$^3$/h;
and subsequently
as a second step to a temperature comprised between 200 and 600° C., preferably between 220 and 550° C., more preferably between 250 and 550° C. for a period comprised between 1 hour and 24 hour, preferably between 60 and 600 minutes, more preferably between 150 and 330 minutes, said temperature being obtained using a heating gradient comprised between 1.0 and 5.0° C./min. and an air flow between 0.1 and 1.0 m$^3$/h, preferably between 0.4 and 0.6 m$^3$/h;
the calcinated product is ground to a volume median particle diameter ($D_{50}$) of less than 450 μm, preferably less than 250 μm.

After both heating cycles, the support precursor is converted into a calcinated product, i.e. the support, comprising one or more components selected from the group consisting of hydroxides, oxide hydroxides and oxides while the catalyst precursors are converted into oxides, wherein the graphitization catalyst is preferably present as a mixed oxide.

The type of the heat source used in both heating cycles is not limited and may be, for example, induction heating, radiant heating, laser, IR, microwave, plasma, UV or surface plasmon heating.

The inventors have observed that the BET of the support precursor, $Al(OH)_3$, is an important parameter for obtaining an iron-free supported catalyst enabling the production of MWCNT at a high carbon yield.

In the method according to the present disclosure the BET of the $Al(OH)_3$ support precursor is comprised between 3 and 18 $m^2/g$, preferably between 5 and 16 $m^2/g$.

The conversion of gibbsite to boehmite, studied by X-Ray Diffraction, is for example described by A. M. d A. Cruz et al. in Applied Catalysis A: General 167 (1998), pp. 203-213.

The qualitative and quantitative analysis of aluminum oxide hydroxide (boehmite) in aluminum oxide (bauxite) by X-Ray Diffraction is for example described by G. A. B. Soares et al. in Rev. Esc. Minas, 2014, vol. 67, n. 1, pp. 41-46.

The inventors have experienced that the presence of aluminum oxide hydroxide in the iron-free supported catalyst, can be easily identified with certainty by X-Ray Diffraction, yet this quantification is subject to uncertainty and thus should be limited to an estimation of the weight percentage of AlO(OH) on the total of $Al_2O_3$, $Al(OH)_3$ and AlO(OH).

That aside, the inventors have observed that aluminum oxide hydroxide is present in an amount of at least 30% by weight, preferably of at least 40% by weight, more preferably of at least 50% by weight, most preferably of at least 60% by weight and even of at least 70% by weight of the total of $Al_2O_3$, $Al(OH)_3$ and AlO(OH).

In the method of the present disclosure, the first heating cycle, intended to dry the paste, may be replaced by alternative drying methods well known in the art, or combinations thereof. Among these, flash drying or spray drying are widely used.

A typical supported catalyst according to the present disclosure is represented by the formula $(Co_vV_w)O_y \cdot (support)_z$ or $(Co_vV_wMo_x)O_y \cdot (support)_z$.

The iron-free two component graphitization catalyst is characterized in that:
  it comprises aluminum oxide hydroxide, preferably at least 30% by weight of aluminum oxide hydroxide based on the total weight of aluminum oxide, aluminum hydroxide and aluminum oxide hydroxide;
  the mass ratio of cobalt to aluminum is between $5.8 \cdot 10^{-2}$ and $5.8 \cdot 10^{-1}$, preferably between $1.2 \cdot 10^{-1}$ and $4.3 \cdot 10^{-1}$;
  the mass ratio of vanadium to aluminum is between $5.8 \cdot 10^{-3}$ and $8.7 \cdot 10^{-2}$, preferably between $1.2 \cdot 10^{-2}$ and $5.8 \cdot 10^{-2}$.

The iron-free two component graphitization catalyst is further characterized in that the mass ratio of cobalt to vanadium is comprised between 2 and 15, preferably between 3.0 and 11.

The iron-free three component graphitization catalyst is characterized in that:
  it comprises aluminum oxide hydroxide, preferably at least 30% by weight of aluminum oxide hydroxide based on the total weight of aluminum oxide, aluminum hydroxide and aluminum oxide hydroxide;
  the mass ratio of cobalt to aluminum is between $5.8 \cdot 10^{-2}$ and $5.8 \cdot 10^{-1}$, preferably between $1.2 \cdot 10^{-1}$ and $4.3 \cdot 10^{-1}$;
  the mass ratio of vanadium to aluminum is between $5.8 \cdot 10^{-3}$ and $8.7 \cdot 10^{-2}$, preferably between $1.2 \cdot 10^{-2}$ and $5.8 \cdot 10^{-2}$; and
  the mass ratio of molybdenum to aluminum is between $1.2 \cdot 10^{-3}$ and $2.3 \cdot 10^{-2}$, preferably between $1.7 \cdot 10^{-3}$ and $1.7 \cdot 10^{-2}$.

The iron-free three component graphitization catalyst is further characterized in that the ratio of cobalt mass to the combined vanadium and molybdenum mass is comprised between 2 and 15, preferably between 3.0 and 11.

The iron-free supported catalysts of the present disclosure are characterized by a XRD pattern, recorded in the 2θ range of 10° to 80°, having a maximum diffraction peak, defined as "a", at a 2θ angle of 35° to 38°, wherein
  the ratio b/a of the intensity of a diffraction peak at a 2θ angle of 17° to 22°, defined as "b", over the intensity of the maximum diffraction peak "a", is in the range of 0.10 to 0.7, preferably in the range of 0.12 to 0.7, more preferably in the range of 0.14 to 0.7;
  the ratio c/a of the intensity of a diffraction peak at a 2θ angle of 63° to 67°, defined as "c", over the intensity of the maximum diffraction peak "a", is in a range of 0.51 to 0.7; and
  both criteria b/a (0.10 to 0.7) and c/a (0.51 to 0.7) are met.

For the preparation of MWCNT, the supported iron-free catalyst is brought into contact with a carbon source in the gas phase.

The use of the supported catalyst allows for growth of the carbon nanotubes by chemical vapor synthesis through decomposition of the carbon source, leading to the production of the carbon nanotube aggregate.

According to the chemical vapor synthesis, the iron-free graphitization catalyst is charged into a reactor and the carbon source in the gas phase is then supplied to the reactor at ambient pressure and high temperature to produce the carbon nanotube aggregate in which the carbon nanotubes are grown on the supported catalyst. As described above, the carbon nanotubes are grown by thermal decomposition of a hydrocarbon as carbon source. The thermally decomposed hydrocarbon is infiltrated and saturated in the graphitization catalyst and carbon is deposited from the saturated graphitization catalyst to form hexagonal ring structures.

The chemical vapor synthesis can be performed in such a manner that the supported catalyst is fed into a reactor and at least one carbon source selected from the group consisting of $C_1$-$C_6$ saturated hydrocarbons, $C_1$-$C_6$ unsaturated hydrocarbons, $C_1$-$C_2$ alcohols and mixture thereof, optionally together with a reducing gas (e.g., hydrogen) and a carrier gas (e.g., nitrogen), is introduced into the reactor at a temperature equal to or higher than the thermal decomposition temperature of the carbon source in the gas phase to a temperature equal to or lower than the melting point of the graphitization catalyst, for example, at a temperature comprised between 500 and about 900° C., preferably between 600 and 800° C., more preferably between 650 and 750° C. Carbon nanotubes may be grown for 1 minute to 5 hours, preferably 1 minute to 30 minutes after the carbon source is introduced into the supported catalyst.

Preferably, the space time, defined as the weight of supported catalyst in grams divided by the flow of reactant stream in mole/h, at standard temperature and pressure conditions, is comprised between 0.1 and 0.8 g·h/mole, preferably between 0.2 and 0.6 g·h/mole during a period comprised between 10 and 30 minutes, preferably between 15 and 25 minutes.

The type of the heat source for the heat treatment in the method for preparing the MWCNT is not limited and may be, for example, induction heating, radiant heating, laser, IR, microwave, plasma, UV or surface plasmon heating.

Any carbon source that can supply carbon and can exist in the gas phase at a temperature of 300° C. or more may be used without particular limitation for the chemical vapor synthesis. The gas-phase carbonaceous material may be any carbon-containing compound but is preferably a compound consisting of up to 6 carbon atoms, more preferably a compound consisting of up to 4 carbon atoms. Examples of such gas-phase carbonaceous materials include, but are not limited to, carbon monoxide, methane, ethane, ethylene, methanol, ethanol, acetylene, propane, propylene, butane, butadiene, pentane, pentene, cyclopentadiene, hexane, cyclohexane, benzene, and toluene. These gas-phase carbonaceous materials may be used alone or as a mixture thereof. The mixed gas of reducing gas (e.g. hydrogen) and carrier gas (e.g. nitrogen) transports the carbon source, prevents carbon nanotubes from burning at high temperature, and assists in the decomposition of the carbon source.

The iron-free catalyst according to the present disclosure allows for the production of MWCNT at a carbon yield comprised between 800 and 2500% by weight, preferably between 1000 and 2400% by weight, more preferably between 1100 and 2300% by weight.

The carbon yield, in % by weight, is defined as:

$$100(m_{tot}-m_{cat})/m_{cat}$$

wherein $m_{tot}$ is the total weight of product after reaction and $m_{cat}$ is the weight of the catalyst used for the reaction.

EXAMPLES

The following illustrative examples are merely meant to exemplify the present disclosure but they are not intended to limit or otherwise define the scope of the present disclosure.

Example 1. Synthesis of the Iron-Free Two Component Graphitization Catalyst 5000 parts by weight of water, at 60° C., comprising 277 parts by weight of citric acid and 387 parts by weight of malic acid, were added to 333 parts by weight of ammonium metavanadate, and mixed during 15 minutes using a paddle mixer, resulting in a first aqueous solution.

Similarly, 5000 parts by weight of water, at 60° C., were added to 4109 parts by weight of cobalt(II) acetate tetrahydrate and mixed during 15 minutes using a paddle mixer, resulting in a second aqueous solution.

The second aqueous solution was added to the first aqueous solution and mixed during 15 minutes using a paddle mixer.

To the mixture of the first and the second aqueous solution, 13333 parts by weight of aluminum hydroxide (Apyral® 200 SM—Nabaltec), with specific surface area (BET) of 15 m²/g, was added and mixed during 15 minutes using a paddle mixer.

The paste thus obtained was then transferred to ceramic crucibles with a large opening and subjected to a heating process, wherein the paste was heated to 120° C. with a heating gradient of 2° C./min and an air flow of 0.5 m³/h and maintained at 120° C. for 5 hours.

After 5 hours at 120° C., the paste was further heated to a temperature of 400° C. with a heating gradient of 2° C./min. and maintained at 400° C. for 5 hours while maintaining an air flow of 0.5 m³/h.

The solid material thus obtained was cooled down to room temperature and ground, by means of a conical grinder, to a powder characterized by a volume median particle diameter ($D_{50}$) of 120 μm.

Example 2. Synthesis of the Iron-Free Three Component Graphitization Catalyst Example 1 was repeated with the exception that 5000 parts by weight of water, at 60° C., comprising 277 parts by weight of citric acid and 387 parts by weight of malic acid, were added to 340 parts by weight of ammonium metavanadate and 64 parts by weight of ammonium heptamolybdate tetrahydrate, resulting in a first aqueous solution. The second aqueous solution is obtained by adding 5000 parts by weight of water, at 60° C., to 4931 parts by weight of cobalt(II) acetate tetrahydrate To the mixture of the first and the second aqueous solution, 13333 parts by weight of aluminum hydroxide (Apyral® 200 SM—Nabaltec), with a specific surface area (BET) of 15 m²/g, was added and mixed during 15 minutes using a paddle mixer.

Example 3 to 8

In the examples 3 to 8:
- the vanadium-based precursor is ammonium metavanadate;
- the molybdenum-based precursor is ammonium heptamolybdate tetrahydrate;
- the cobalt-based precursor is cobalt(II) acetate tetrahydrate for example 3 and examples 5 to 8;
- the cobalt-based precursor is cobalt(II) nitrate tetrahydrate for example 4
- Al(OH)₃ of example 3 is ALOLT 59 AF (Inotal) characterized by a BET of 5.4 m²/g
- Al(OH)₃ of example 4 is Hydral 710 (Huber) characterized by a BET of 4 m²/g;
- Al(OH)₃ of examples 5 and 6 is Apyral 40 CD (Nabaltec) characterized by a BET of 3.5 m²/g;
- Al(OH)₃ of examples 7 and 8 is Martinal OL-111 LE (Huber) characterized by a BET of 10-12 m²/g.

Examples 3 to 7 are prepared using the process conditions of example 1, i.e. temperature and time period of mixing, drying and calcinating conditions (temperature, heating gradient, time, air flow), and grinding conditions for obtaining a $D_{50}$ of about 120 μm, with the exception that the cobalt-based precursor is added as a powder to the aqueous solution comprising the vanadium-based precursor and the optional molybdenum-based precursor, said aqueous solution comprising 5000 parts by weight of water.

Example 8 is a comparative example wherein the support precursor is calcinated before being added to, and mixed with, the aqueous mixture comprising the cobalt-based precursor, the vanadium-based precursor and the molybdenum-based precursor. The support precursor is first impregnated with water and stirred for 12 hours at 60° C., before being dried at 60° C. and 100 mbar. Subsequently the dried support precursor is calcinated at a temperature of 400° C. during 5 hours under a nitrogen atmosphere, whereupon the calcinated support is added to the aqueous mixture of catalyst precursors. The aqueous mixture comprising the cobalt-based precursor, the vanadium-based precursor and the molybdenum-based precursor is obtained from adding the cobalt-based precursor, as a powder, to the aqueous solution comprising the vanadium-based precursor, the molybdenum-based precursor and 5000 parts by weight of water. The resulting paste was heated to 120° C. with a heating gradient of 2° C./min and an air flow of 0.5 m$^3$/h and maintained at 120° C. for 5 hours.

Subsequently the paste was further heated to a temperature of 400° C. with a heating gradient of 2° C./min and maintained at 400° C. for 5 hours while maintaining an air flow of 0.5 m$^3$/h. Diffraction peaks corresponding to boehmite, AlO(OH), were not detected.

In table 1 the quantities of catalyst precursors, the support precursor and the polycarboxylic acid(s) and/or the salts thereof, in parts for 5000 parts by weight of water, are reported for examples 3 to 8.

TABLE 1

| Example | Support precursor | Cobalt precursor | Vanadium precursor | Molybdenum precursor | Citric acid | Malic acid | Dibasic salt citric acid |
|---|---|---|---|---|---|---|---|
| 3 | 3335 | 835 | 35 | | 85 | 35 | |
| 4 | 3335 | 970 | 100 | 5 | 50 | | 85 |
| 5 | 6667 | 2667 | 267 | 33 | 200 | 296 | |
| 6 | 6250 | 1200 | 70 | 60 | | 135 | 120 |
| 7 | 6665 | 1810 | 225 | 55 | 140 | 195 | |
| 8 | 2500 | 1430 | 65 | 10 | 105 | | |

Synthesis of MWCNT 1.0 g of the iron-free supported graphitization catalyst of examples 1 to 8 were spread in a quartz vessel which subsequently was brought in the center of a quartz tube-type reactor with an inlet and an outlet.

The center of the quartz tube reactor where the vessel comprising the catalyst is located was heated to a temperature of 700° C.

Subsequently ethylene gas, nitrogen and hydrogen were allowed to flow through the quartz tube reactor at a flow rate of 1.744 l/min ($C_2H_4$); 0.857 l/min ($N_2$) and 0.286 l/min ($H_2$) during 20 minutes.

In table 2, carbon yield (column 8) is given for the MWCNT (examples A to H) (column 1) prepared using the catalysts of examples 1 to 8 (column 2).

Furthermore table 2 shows
the ratio of cobalt to aluminum of the supported catalyst (column 3);
the ratio of vanadium to aluminum of the supported catalyst (column 4);
the ratio of molybdenum to aluminum of the supported catalyst (column 5);
the ratio of cobalt to vanadium for the iron-free two component graphitization supported catalyst and the ratio of cobalt to vanadium and molybdenum for the iron-free three component graphitization supported catalyst (column 6).
the BET (m$^2$/g) of the respective Al(OH)$_3$ support precursors (column 7).

As clearly appears from table 2, the iron-free supported catalysts according to the present disclosure (examples 1 to 7) give rise to a MWCNT (examples A to G) with a carbon yield of at least 800%, contrary to the MWCNT obtained from a process using an iron-free supported catalyst (example 8), wherein the support precursor is calcinated before impregnation with the catalyst precursors. MWCNT with the highest carbon yield are obtained from iron-free supported catalysts, prepared from Al(OH)$_3$ support precursor, characterized by a BET comprised between 10 and 15 m$^2$/g.

The iron-free supported catalyst of example 8 (=comparative example) gives rise to a MWCNT (example H) with a carbon yield of 554%, though said supported catalyst is prepared from Al(OH)$_3$ support precursor with a BET of 10-12 m$^2$/g. For the iron-free supported catalyst of example 8 (=comparative example), diffraction peaks corresponding to boehmite, AlO(OH), were not detected.

The inventors have surprisingly observed that a calcination temperature, of the dried mixture of aluminum hydroxide and the catalytic precursors, comprised between 200° C. and 600° C. results in multi-wall carbon nanotubes with a high carbon yield, contrary to multi-wall carbon nanotubes resulting from a supported catalysts obtained from the same dried mixture but calcinated at a temperature above 600° C.

The inventors have observed as well that also the drying method has an influence, although to a lesser extent, on carbon yield of the final multi-wall carbon nanotubes.

The influence of the calcination temperature is reflected by the ratios of the intensity of diffraction peaks in the XRD pattern of the supported catalyst, recorded in the 2θ range of 10° to 80°.

In the XRD pattern, a diffraction peak with maximum intensity at a 2θ angle of 35° to 38° is defined as "a". When the intensity of the diffraction peak at a 2θ angle of 17° to 22° is defined as "b" and the intensity of the diffraction peak at a 2θ angle of 63° to 67° is defined as "c", multi-wall carbon nanotubes with high carbon yield are prepared when using the iron-free supported catalyst where both conditions of intensity ratios (b/a and c/a), being the ratio b/a comprised between 0.10 and 0.7 and the ratio c/a comprised between 0.51 and 0.7, are met.

TABLE 2

| | | Iron-free supported catalyst | | | | | |
|---|---|---|---|---|---|---|---|
| Example MWCNT | Example Catalyst | Co/Al | V/Al | Mo/Al | Co/V + (Mo) | BET Al(OH)$_3$ (m$^2$/g) | MWCNT Yield (%) |
| A | 1 | 2.12 10$^{-1}$ | 3.11 10$^{-2}$ | | 6.7 | 15 | 1953 |
| B | 2 | 2.53 10$^{-1}$ | 3.20 10$^{-2}$ | 7.54 10$^{-3}$ | 6.4 | 15 | 2076 |
| C | 3 | 1.71 10$^{-1}$ | 1.26 10$^{-2}$ | | 13.6 | 5.4 | 1161 |
| D | 4 | 1.71 10$^{-1}$ | 3.78 10$^{-2}$ | 2.36 10$^{-3}$ | 4.3 | 4 | 891 |
| E | 5 | 2.71 10$^{-1}$ | 5.07 10$^{-2}$ | 7.78 10$^{-3}$ | 4.7 | 3.5 | 891 |
| F | 6 | 1.31 10$^{-1}$ | 1.36 10$^{-2}$ | 1.50 10$^{-3}$ | 4.6 | 3.5 | 919 |
| G | 7 | 1.85 10$^{-1}$ | 4.25 10$^{-2}$ | 1.25 10$^{-2}$ | 3.4 | 10-12 | 1862 |
| H | 8 | 3.91 10$^{-1}$ | 3.16 10$^{-2}$ | 5.49 10$^{-3}$ | 10.6 | 10-12 | 554 |

In table 3, the value of the 2θ angle, the net intensity at said 2θ angle and the intensity ratios b/a and c/a of the supported catalyst, obtained from different drying methods and calcination temperatures, are reported.

In table 4, the carbon yield, in % by weight of MWCNT of example B, obtained from the iron-free supported catalyst of example 2 is reported for drying the catalyst precursor:
  during 5 hours at 120° C., wherein the precursor paste was heated to 120° C. with a heating gradient of 2° C./min and an air flow of 0.5 m³/h;
  diluting the precursor paste, so that 10,000 parts of precursor paste are converted in 25,000 parts of precursor dispersion, sufficiently fluid for peristaltic pumping to the spray dryer equipment GB-210A from Yamato Scientific with settings:
    blower: 0.5 m³/h (=hot air flow for drying))
    atomizer: 0.1 MPa (=air pressure generating the spray)
    drying temperature: 150° C. (=air temperature at the entrance of the drying column)
    pump: 7 (=flow rate of the pumped liquid, depending on the speed of the pump and the viscosity of the liquid, and therefore on its dilution. In the present experiment the flow rate equals +/−at 17 g/min.)

The inventors have observed that calcination of the dried mixture of aluminum hydroxide and the catalytic precursors, at a temperature of 700° C., results in multi-wall carbon nanotubes with lower carbon yield; at a calcination temperature of 700° C., the intensity ratio (b/a) is not met. Diffraction peaks corresponding to boehmite (AlO(OH)) are not detected.

A reduced carbon yield, in % by weight, relative to the carbon yield, in % by weight, of the MWCNT of example B (Carbon Yield=2076%), was obtained when repeating example B using the iron-free three component graphitization catalyst of example 2, but calcinated for 5 hours at 550° C. and 700° C. respectively. As such, a reduction of about 14% carbon yield, relative to carbon yield of example B, was observed for the catalyst of example 2, but calcinated for 5 hours at 550° C. (Carbon Yield=1781%), while a reduction of 42% carbon yield, relative to carbon yield of example B, was observed for the catalyst of example 2 but calcinated for 5 hours at 700° C. (Carbon Yield=1211%).

The spray dried iron-free three component graphitization catalyst of example 2, calcinated during 1 hour at 600° C., resulted in MWCNT at a carbon yield of 1840%.

The invention claimed is:

1. An iron-free supported catalyst for the selective conversion of hydrocarbons to carbon nanotubes, said catalyst comprising cobalt and vanadium as active catalytic metals in any oxidation state on a catalyst support comprising at least 30% by weight of aluminum oxide hydroxide based on the total of aluminum hydroxides and/or aluminum oxides and aluminum oxide hydroxide, as determined by X-Ray diffraction, wherein:
  the mass ratio of cobalt to vanadium is between 2 and 15;
  the mass ratio of cobalt to aluminum is between $5.8 \, 10^{-2}$ and $5.8 \, 10^{-1}$; and
  the mass ratio of vanadium to aluminum is between $5.8 \, 10^{-3}$ and $8.7 \, 10^{-2}$.

2. The iron-free supported catalyst according to claim 1, wherein:
  the mass ratio of cobalt to vanadium is between 3.0 and 11;
  the mass ratio of cobalt to aluminum is between $1.2 \, 10^{-1}$ and $4.3 \, 10^{-1}$; and
  the mass ratio of vanadium to aluminum is between $1.2 \, 10^{-2}$ and $5.8 \, 10^{-2}$.

3. The iron-free catalyst according to claim 1 comprising molybdenum as additional active catalyst, wherein:
  the mass ratio of molybdenum to aluminum is between $1.2 \, 10^{-3}$ and $2.3 \, 10^{-2}$; and
  the mass ratio of cobalt to the combined mass of vanadium and molybdenum is between 2 and 15.

4. The iron-free catalyst according to claim 3, wherein:
  the mass ratio of molybdenum to aluminum is between $1.7 \, 10^{-3}$ and $1.7 \, 10^{-2}$; and
  the mass ratio of cobalt to the combined mass of vanadium and molybdenum is between 3 and 11.

5. The iron-free catalyst according to claim 1 having a maximum diffraction peak at a 2θ angle of 35° to 38° in the XRD pattern recorded in the 2θ range of 10° to 80°, wherein
  when the intensity of the maximum diffraction peak and the intensity of a diffraction peak at a 2θ angle of 17° to 22° are defined as "a" and "b", respectively, the ratio b/a is 0.10 to 0.7, and
  when the intensity of a diffraction peak at a 2θ angle of 63° to 67° is defined as "c", the ratio c/a is in a range of 0.51 to 0.7.

6. The iron-free catalyst according to claim 1, wherein the catalyst support comprises at least 40% by weight of alu-

TABLE 3

| calcination temperature | calcination time | drying | a (35-38°) | | b (17-21°) | | | c (63-67°) | | |
|---|---|---|---|---|---|---|---|---|---|---|
| | | | angle | net intensity | angle | net intensity | b/a | angle | net intensity | c/a |
| 250° C. | 5 h | furnace | 36.730° | 4246 | 20.325° | 2836 | 0.668 | 66.393° | 2641 | 0.622 |
| 400° C. | 5 h | furnace | 36.947° | 3665 | 19.543° | 831 | 0.227 | 65.368° | 2528 | 0.69 |
| 550° C. | 5 h | furnace | 36.867° | 6767 | 19.048° | 1016 | 0.15 | 65.278° | 3510 | 0.519 |
| 700° C. | 5 h | furnace | 36.913° | 8639 | 19.215° | 621 | 0.072 | 65.544° | 5169 | 0.598 |

TABLE 4

| | 200° C. | | 250° C. | | 400° C. | | 550° C. | | 700° C. | |
|---|---|---|---|---|---|---|---|---|---|---|
| | Furnace drying | Spray drying | Furnace drying | Spray drying | Furnace drying | Spray drying | Furnace drying | Spray drying | Furnace drying | Spray drying |
| 1 h | 1846% | 1755% | 1864% | 2035% | 2227% | 2216% | 2079% | 2084% | 1203% | 900% |
| 5 h | 1833% | 1779% | 2130% | 2047% | 2076% | 2249% | 1781% | 1887% | 1211% | 652% |
| 24 h | 1852% | 1763% | 2158% | 2102% | 2147% | 2172% | 1844% | 1975% | 652% | 627% | minum oxide hydroxide based on the total of aluminum hydroxides and/or aluminum oxides and aluminum oxide hydroxide, as determined by X-Ray diffraction.

7. A method for the production of the iron-free supported catalyst of claim 1 comprising the steps of:
- contacting an aqueous solution comprising one or more polycarboxylic acid(s) and/or the salt(s) of polycarboxylic acids, with one or more vanadium-based precursor(s) and optionally with one or more molybdenum-based precursor(s);
- contacting the one or more cobalt-based precursor(s) with the aqueous solution comprising the vanadium-based precursor(s) and the optional additional molybdenum-based precursor(s) to form a water-based mixture of catalytic precursors;
- contacting aluminum hydroxide, having a BET comprised between 3 and 18 $m^2/g$, with the water based mixture comprising the catalytic precursors to form a water-based mixture of aluminum hydroxide and the catalytic precursors;
- drying the water-based mixture of aluminum hydroxide and the catalytic precursors to form a dried mixture;
- calcinating the dried mixture at a temperature comprised between 200° C. and 600° C. to form a calcinated product comprising at least 30% by weight of aluminum oxide hydroxide based on the total of aluminum hydroxides and/or aluminum oxides and aluminum oxide hydroxide, as determined by X-Ray diffraction; and
- grinding the calcinated product to a powder.

8. The method according to claim 7, wherein the water-based mixture of aluminum hydroxide and the catalytic precursors is dried at a predetermined temperature of at least 100° C. for at least 1 hour with an air flow of at least 0.1 $m^3/h$.

9. The method according to claim 7, wherein the water-based mixture of aluminum hydroxide and the catalytic precursors is dried at a predetermined temperature comprised between 100 and 150° C. for a period comprised between 1 hour and 10 hours with an air flow comprised between 0.1 $m^3/h$ and 1 $m^3/h$.

10. The method according to claim 7, wherein the water-based mixture of aluminum hydroxide and the catalytic precursors is dried by spray drying.

11. The method according to claim 7, wherein the dried mixture is calcinated at a temperature comprised between 220 and 550° C. for a period comprised between 1 and 24 hours with an air flow comprised between 0.1 $m^3/h$ and 1 $m^3/h$.

12. The method according to claim 7, wherein the calcinated product is ground to a powder with a volume median particle diameter ($D_{50}$), of less than 450 µm.

13. The method according to claim 7, wherein aluminum hydroxide is characterized by a specific surface area (BET) comprised between 5 and 16 $m^2/g$.

14. The method according to claim 7, wherein the aluminum hydroxide is selected from gibbsite or bayerite.

15. The method according to claim 7, wherein the cobalt-based precursor(s), the vanadium-based precursor(s), the molybdenum-based precursor(s), and the support precursor have a purity of at least 95%.

16. The method according to claim 7, wherein the cobalt-based precursor is cobalt(II) acetate tetrahydrate and/or cobalt(II) nitrate tetrahydrate, the vanadium-based precursor is ammonium metavanadate, and the molybdenum-based precursor is ammonium heptamolybdate tetrahydrate.

17. The method according to claim 7, wherein the polycarboxylic acid is a blend of citric acid and malic acid wherein the mole ratio malic acid/citric acid is between 0.5 and 5.

18. The method of claim 7, further comprising producing multi-walled carbon nanotubes by:
- charging the catalyst into a reactor;
- heating the catalyst to a temperature comprised between 500° C. and 900° C.;
- supplying a carbon source to the reactor while maintaining the temperature comprised between 500° C. and 900° C.; and
- contacting the catalyst with the carbon source for a time period of at least 1 minute.

19. The method according to claim 18, wherein the space time between catalyst and carbon source is between 0.1 and 0.8 g·h/mole, wherein the space time is defined as the weight of supported catalyst in grams divided by the flow of reactant stream in mole/h, at standard temperature and pressure conditions.

20. The method according to claim 18, wherein the carbon source is selected from the group consisting of methane, ethylene, acetylene, methanol, ethanol, and mixtures of methane, ethylene, acetylene, methanol, and/or ethanol.

21. Multi-walled carbon nanotubes, obtained by the method according to claim 18, comprising between 0.1 and 13% by weight.

22. A polymer matrix comprising the multi-walled carbon nanotubes according to claim 21.

23. Use of the multi-walled carbon nanotubes according to claim 21 in batteries.

* * * * *

UNITED STATES PATENT AND TRADEMARK OFFICE
CERTIFICATE OF CORRECTION

PATENT NO. : 11,826,732 B2
APPLICATION NO. : 18/000048
DATED : November 28, 2023
INVENTOR(S) : Fang-Yue Chan, Matthieu Houlle and Jean-Philippe Joris It is certified that error appears in the above-identified patent and that said Letters Patent is hereby corrected as shown below:

In the Claims

Column 18, Line 43, the text "comprising between 0.1 and 13% by weight" should read --comprising between 0.1 and 13% by weight of the catalyst--.

Signed and Sealed this
Twenty-third Day of January, 2024

Katherine Kelly Vidal
*Director of the United States Patent and Trademark Office*